United States Patent [19]

Wilson et al.

[11] 4,032,282

[45] June 28, 1977

[54] APPARATUS FOR FORMING BELLS ON PLASTIC TUBES

[75] Inventors: Clyde E. Wilson; Robert D. Nicoson, both of Brazil, Ind.

[73] Assignee: Wilson-Tek Corporation, Brazil, Ind.

[22] Filed: Aug. 5, 1975

[21] Appl. No.: 602,128

Related U.S. Application Data

[63] Continuation-in-part of Ser. Nos. 400,165, Sept. 24, 1973, abandoned, and Ser. No. 512,230, Oct. 14, 1974, abandoned.

[52] U.S. Cl. .................... 425/393; 425/DIG. 218; 249/181; 249/182
[51] Int. Cl.² ........................................... B28B 7/30
[58] Field of Search ............ 425/392, 393, DIG. 5, 425/DIG. 218; 249/177, 178, 180, 181, 182, 184, 142

[56] References Cited

UNITED STATES PATENTS

| | | | |
|---|---|---|---|
| 404,673 | 6/1889 | Bennett | 249/181 |
| 639,508 | 12/1899 | Bonta | 249/181 |
| 693,571 | 2/1902 | Shaw | 249/181 X |
| 744,362 | 11/1903 | Kondolf | 29/272 |
| 769,789 | 8/1905 | Adam | 249/180 |
| 814,304 | 3/1906 | Landmann | 425/406 |
| 1,698,999 | 1/1929 | Hothersall | 425/DIG. 5 |
| 3,210,039 | 10/1965 | Long | 249/181 X |
| 3,279,739 | 10/1966 | Long | 249/181 |
| 3,279,740 | 10/1966 | Long | 249/181 |
| 3,279,741 | 10/1966 | Long | 249/177 X |
| 3,677,684 | 7/1972 | Platz | 425/469 X |
| 3,728,059 | 4/1973 | Jan de Putter | 425/393 X |
| 3,729,282 | 4/1973 | Herter | 425/393 |
| 3,732,054 | 5/1973 | Lyng | 425/393 |
| 3,749,543 | 7/1973 | Stansbury | 425/393 |
| 3,773,456 | 11/1973 | Salz et al. | 425/393 X |
| 3,853,299 | 12/1974 | Kessel | 249/178 |

*Primary Examiner*—Richard B. Lazarus
*Attorney, Agent, or Firm*—Fulwider, Patton, Rieber, Lee & Utecht

[57] ABSTRACT

Apparatus for forming internally grooved bells on plastic tubes having a mandrel comprising coaxial front and rear mandrel elements spaced apart to form a gap, angularly spaced supporting pins joining internal flanges on the elements across the gap, two sets of alternating core sections in the gap, one set having inwardly converging sides and the other having inwardly diverging sides and convex inner ends with concave central dwell areas, and an expanding spider supported in the gap on a shaft journaled in a rear end wall of the rear mandrel element. The spider has angularly spaced arms on which rollers are rotatably mounted to roll along the convex inner ends of the core sections of one set as the shaft is rotated back and forth by an actuator, and arcuate recesses are formed in the central portions of the ends to stabilize the rollers in the expanded position. An internal annular shoulder on one of the flanges opposes arcuate shoulders on the core sections to determine the expanded condition, and springs act between the shaft and the core sections to retract the latter. An external split mold ring is provided to confine tubes around the mandrel.

22 Claims, 4 Drawing Figures

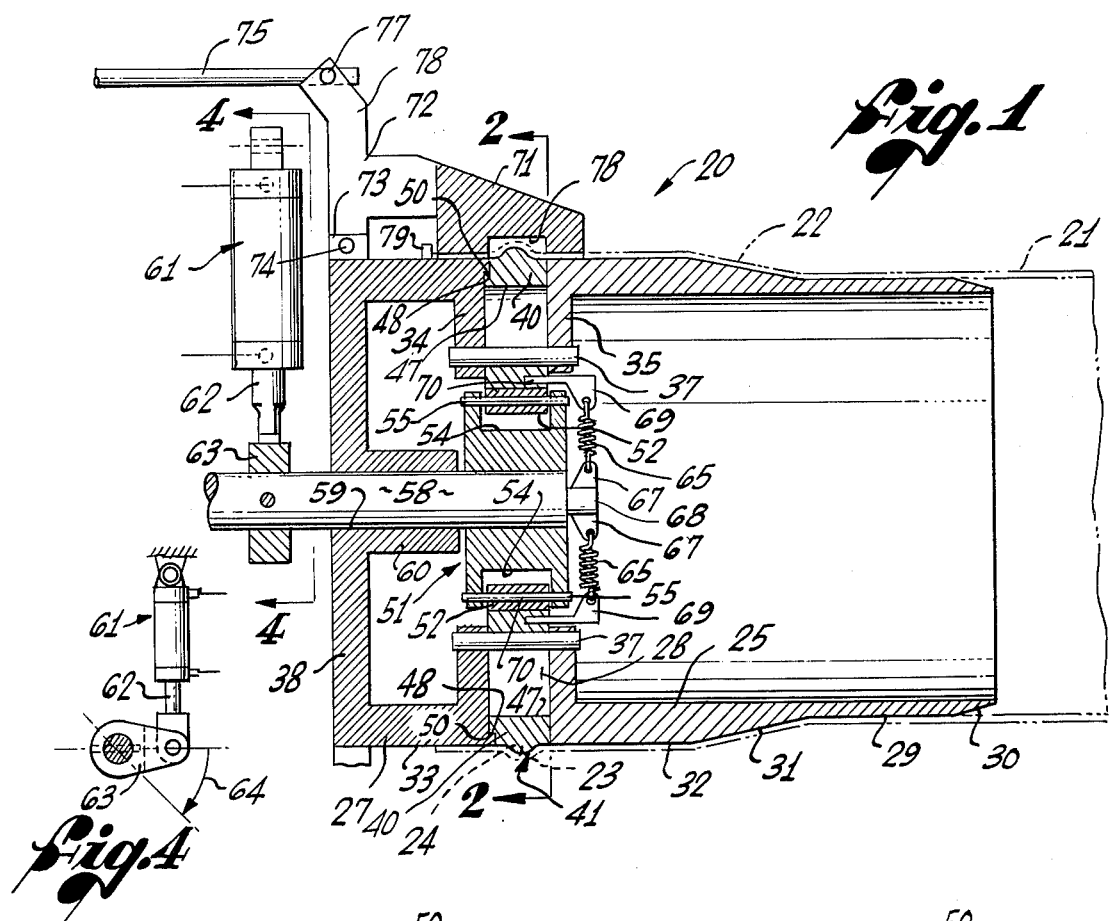
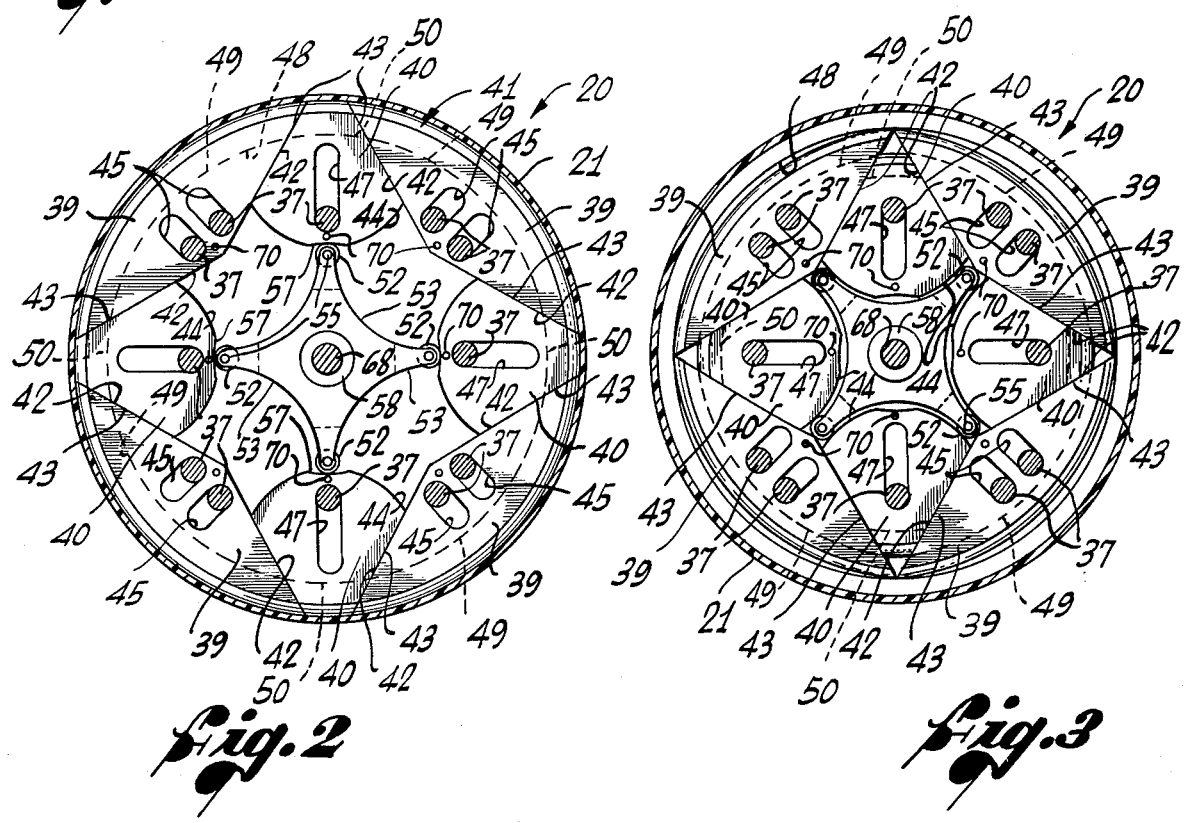

APPARATUS FOR FORMING BELLS ON PLASTIC TUBES

CROSS-REFERENCE TO RELATED APPLICATIONS

This application is a continuation-in-part of copending application Ser. No. 400,165, filed Sept. 24, 1973, and of application Ser. No. 512,230, filed Oct. 14, 1974, both entitled APPARATUS FOR FORMING BELLS ON PLASTIC TUBES and both now abandoned.

BACKGROUND OF THE INVENTION

In recent years, the place of heavy cast iron, steel and concrete pipe has largely been taken over by pipe made by the extrusion of plastic materials which are not only lighter in weight but appear to have comparable resistance to deterioration in certain applications such as drainage and soil work.

Pipes of this type, having diameters in the range of two inches or more, usually are formed in sections of uniform length, one end of each section having a radial enlargement, or bell, sufficient to receive the unenlarged end of another similar pipe.

The inside diameter of the bell is sufficiently large to easily receive the end of the next section of pipe and may be large enough to allow a sealing material to be packed in around the joint. In other cases, the bell may be provided with an internal annular recess into which a sealing material, such as a ring of resilient material, is inserted and the adjacent pipe end is forced in beyond the sealing ring.

However, difficulty has been experienced in the formation of the annular recess in such bells because it requires the use of apparatus capable of deforming outwardly only a portion of the axial length of the bell while the material is in a plastic condition, and removing the apparatus after the plastic has solidified.

Multi-section expanding cores having two dissimilar groups of interfitting core sections are known but these devices usually require one of the groups of core sections, or an elongated wedge-like expander, to be moved in an axial direction during contraction and expansion. Other types of core means are known in which one, or both, of the core sections pivot about axes which are axially remote from the plane of their radial movement. In both cases, it is difficult to maintain either circumferential, or radial, alignment of the core sections in their expanded positions with the result that irregularities are produced in the internal annulus produced in the finished pipe bell, which irregularities have a deleterious effect on a sealing ring inserted therein as well as on the effectiveness of the seal itself when the adjacent pipe end is in place. Moreover, the equipment made in accordance to the prior art often is bulky and complex in construction.

Therefore, an object of the present invention is to provide a core means of the type having two groups of expandable and contractible core sections for producing an outwardly deformed annulus on a plastic pipe bell in which the core sections remain at all times in the same common radial plane and in which these sections do not tilt in any way during their movement in contraction and expansion.

A further object of the invention is to provide an improved and simplified expandable and contractible multi-part molding means for forming an internal recess on the bell of a plastic pipe section in which the circumferential alignment of several parts of the molding means can be more easily and accurately obtained.

SUMMARY OF THE INVENTION

The present invention resides in an apparatus of the foregoing character in which the core sections are expanded by a rotary expanding member that is mounted on a shaft inside a mandrel having a peripheral gap in which the core sections are mounted, one set of the core sections having inwardly diverging sides for camming the sections of the other set outwardly, and also having inner end surfaces engageable with the rotary expanding member and shaped to be cammed outwardly as the expanding member rotates in one direction through a preselected angular increment.

The preferred expanding member is a spider having rollers journaled on arms separated by concave recesses, and the preferred shape of the inner end surfaces is convex, with concave central dwell recesses coaxial with the expander for stabilizing the rollers in the expanded condition.

For simplicity of mandrel construction, the mandrel comprises two coaxial mandrel elements with internal flanges at their adjacent ends, the front element being supported on the rear element by angularly spaced pins secured at their ends in the flanges. The core sections have generally radial guide slots through which the pins extend, to serve as guides for the sections as well as supports for the front mandrel element.

To determine the expanded position of the core sections, an internal annular shoulder is formed on one of the flanges, and external arcuate shoulders are formed on the core sections. Springs acting between the shaft and the core sections hold the inner end surfaces against the shaft and retract the core sections.

BRIEF DESCRIPTION OF THE DRAWINGS

FIG. 1 is a longitudinal cross-sectional view through an apparatus constructed in accordance with the present invention, with a plastic tube shown in broken lines on the apparatus, and with the core sections shown in the expanded condition;

FIG. 2 is a transverse cross-sectional view taken through the apparatus of FIG. 1 generally along line 2—2 of FIG. 1, the tube being shown in full cross-section;

FIG. 3 is a view similar to FIG. 2 with parts in moved positions, the core sections being collapsed or retracted; and FIG. 4 is a fragmentary view, partially in cross-section taken along line 4—4 of FIG. 1, and on a somewhat reduced scale.

DETAILED DESCRIPTION

As shown in the drawings for purposes of illustration, the invention is embodied in an apparatus, indicated generally by the reference number 20, for enlarging one end portion of a plastic tube 21, shown in broken lines in FIG. 1, and in full lines in FIGS. 3 and 4, to form a so-called bell 22 on the tube, and also to form a raised bead 23 on the bell, defining an internal annular groove 24 for receiving a seal (not shown). Such tubes are belled while in a heated condition and then are cooled on the apparatus so as to be set in the belled condition, before being removed.

As shown most clearly in FIG. 1, the apparatus generally comprises an elongated mandrel comprising front and rear mandrel elements 25 and 27, typically of circular cross-section, that are disposed in spaced coaxial relation with a gap 28 between them. The front element, on the right in FIG. 1, has a forward portion having an outer surface 29 of a diameter approximately the same as the inside diameter of the tube 21 with a bevel 30 at its free end facilitating entry into the tube, an intermediate portion 31 of progressively increasing outside diameter, and a rear portion having an outer surface 32 of the diameter that is to be the inside diameter of the bell 22. Across the gap 28, the outer surface 33 of the rear mandrel element 27 typically is of the same diameter as the diameter of the rear portion of the front element.

Both mandrel elements 25 and 27 are hollow, and internal annular flanges 34 and 35 are formed on the ends of the elements adjacent the gap 28, these flanges being joined together by a series of angularly spaced supporting pins 37 having opposite end portions that are secured in bores in the flanges. In this manner, the front element 25 is mounted on the rear element 27 without need for support other than the pins 37. The rear element 27 has a rear end wall 38 and is externally supported.

Positioned in the gap 28 in sliding engagement with the adjacent walls of the two flanges 34 and 35 are two groups of segmental core sections 39 and 40 constituting expandable and contractible core means which, when expanded, form a raised bead 41 of circular transverse cross-section and contoured longitudinal cross-section projecting beyond the adjacent outer surfaces 32 and 33 of the mandrel. This bead forms the internal grooves 24 in tubes 21. When contracted (FIG. 3), the core means are retracted into the gap 28 to permit removal of the belled tube from the mandrel.

As shown in FIGS. 2 and 3, the core sections 39 are generally triangular in transverse cross-sectional shape, having arcuate outer surfaces and inwardly converging sides 42 meeting at an apex constituting the inner end of the core section. The other core sections 40 alternate with the sections 39 and have arcuate outer surfaces of angularly shorter extent than the sections 39, and inwardly diverging sides 43 in flat sliding engagement with the sides 42 of two adjacent sections 39. The sections 40 have relatively wide inner end surfaces 44 that preferably are of inwardly convex curvature. In this instance, there of four of each type of core section.

The outer surfaces of the core sections 39 and 40 are formed on the same outside diameters, in transverse section, and have the same longitudinal contour, so that the bead 41 that is formed when the core means are expanded is, in effect, a continuous circular bead that rises from the level of the front mandrel surface 32, forms a general semi-circle in cross-section, and then falls back to the level of the rear mandrel surface 33. It is to be noted, however, that this contour is only illustrative, and that various other contours may be provided to produce sealing grooves of various shapes in plastic pipes.

Each of the core sections 39, 40 has at least one guide slot extending longitudinally through the section and elongated generally radially of the mandrel. In this instance, each section 39 has two slots 45 spaced apart on opposite sides of a radius, and each section 40 has one slot 47 centered on a radius.

The supporting pins 37 which connect the two mandrel elements 25 and 27 are sized and angularly positioned to extend through these slots with smooth sliding fits, and thus stabilize and guide the core sections during their in and out movement. The slots are long enough to accommodate the entire range of movement of the sections during such in and out movement, and may be somewhat longer, because they are not required to limit the movement of the sections.

To limit the outward movement of the core sections 39 and 40 and accurately determine the expanded condition of the core means, opposed abutment surfaces are provided on at least one of the flanges 34, 35 and on the adjacent side of the core means. Herein, these abutment surfaces comprise an internal annular shoulder 48 on the rear flange 34, and outwardly facing arcuate shoulders 49 and 50 on the rear sides of the core sections 39 and 40, formed on the same diameter as the shoulder 48 to engage the latter when the core means are fully expanded. The shoulder 48 provides a register diameter that can be precisely machined, as can the shoulders 49 and 50, to limit outward movement of the core sections to a precisely determined position.

Expansion and contraction of the core means are controlled by actuating means including a rotary expanding member 51 that is mounted in the mandrel in coaxial relation therewith and in longitudinal alignment with the gap 28, and is provided with angularly spaced expanders 52 for engaging the inner end surfaces of the core sections 40 and camming the latter outwardly as the expanding member 51 is rotated in one direction through a preselected angular increment. As shown most clearly in FIGS. 2 and 3, the expanding member is a so-called spider or star wheel having one radially projecting arm for each of the core sections 40, four in this instance, adjacent arms being separated by an arcuate recess 53.

The expanders 52 are elongated cylindrical rollers that are mounted on the free end portions of the arms in cradles formed by notches 54 in the arms, as shown in FIG. 1. Each roller is rotatably supported on a shaft 55 that is parallel to the axis of the mandrel and is supported at its opposite ends on two parallel tabs defining the opposite sides of the notch. The rollers are positioned longitudinally of the mandrel in alignment with the core means, and are engageable with the arcuate inner sides 44 of the core sections 40 to roll along these sides, from the right side, as viewed in FIG. 3, toward the center, as the expanding member is rotated counterclockwise from the retracting position shown in FIG. 3 to the expanding position shown in FIG. 2. As the expanding member is rotated clockwise from the expanding position, the rollers roll from the center back toward the right sides.

Each of the inner end surfaces 44 is formed with a central "dwell" area 57 to stabilize the rollers 52 in the expanding positions and ensure that external forces on the core sections will not accidentally force the rollers off center and allow the core sections to retract. This simplifies the actuation and control of the expander and insures that the core means will remain fully expanded until positively retracted. A very effective dwell area 57 is a slightly concave recess centrally located in each inner end surface 44, and coaxial with the expander and the mandrel.

Supporting the expanding member 51 for back and forth rotation is a shaft 58 which projects into the mandrel from the left end viewed in FIG. 1, through the rear end wall 38 of the rear mandrel element 27, being mounted for coaxial rotation within the mandrel in an axial bore 59 extending through the end wall and through a central annular boss 60 which extends forwardly toward the expanding member. The latter is mounted on the forward end portion of the shaft, and rotates with the shaft.

The shaft 58 and the expanding member 51 are rotated back and forth by means of a suitable actuator 61, herein shown as a double-acting piston-and-cylinder assembly positioned adjacent the rear end of the mandrel and having a piston rod 62 that is pivotally connected to the free end portion of an arm 63 pinned to the shaft 58 and projecting radially therefrom. The length of the stroke of the piston rod determines the angular increment of shaft rotation, here 45°, as indicated at 64 in FIG. 4.

Positive retraction of the core sections 39 and 40 is accomplished by spring means for urging the core sections yieldably inwardly and holding the inner end surfaces 44 in engagement with the rollers 52. As shown in FIG. 1, the illustrative spring means comprise coiled extension springs 65 that are stretched between inner anchor tabs 67 on a stub extension 68 of the forward end of the shaft, and outer anchor tabs 69 on pins 70 that are set into the core sections. The pins 70 project forwardly from the front sides of the core sections, between the inner end of the flange 35 and the outer ends of the expander arms and the tabs 69 extend inwardly from the outer ends of the pins.

Although many belling machines are designed for expansion of the core means only after a tube 21 has been fitted onto the mandrel, it has been found that tubes usually can be forced axially over the mandrel in softened, heated condition while the core means are expanded. The rotary expander 51 holds the core means securely in the expanded condition, and the tubes frequently form themselves to the shape of the mandrel, and around the bead 41, without need for exterior confinement. In other cases, an exterior confinement, such as a mold ring, may be necessary to clamp the tube around the mandrel.

For this purpose, a split mold ring comprising a pair of arcuate die sections 71 is mounted on the rear end portion of the mandrel, one of the sections being shown in FIG. 1 and the other (not shown) being substantially identical. The die section 71 is mounted on a bell crank 72 that is pivotally connected to a bracket 73 on the rear mandrel element 27 by a pivot pin 74. A linkage 75 is pivotally connected by a pin 77 to an upwardly projecting leg 78 of the bell crank to rock the latter back and forth about the pivot pin 74, thus raising the die section away from the closed position shown in FIG. 1 for insertion of a tube 21, and lowering it back into the closed position to clamp the tube. The inner faces of the die sections need not conform to the shape of the bead 23, but simply can be annularly recessed, as at 78, to allow beads of different configurations to be used on the core sections.

With the foregoing arrangement, it can be seen that a heated and softened plastic tube 21 can be forced over the mandrel from the free right end, as viewed in FIG. 1, will be enlarged in passing over the intermediate portion 31, and will slide across the gap 28 and under the mold ring, the latter being open to receive the tube. Preferably, a stop 79 is provided to engage the end of the tube and limit its movement onto the mandrel.

Assuming that the core means are expanded as a tube 21 is forced onto the mandrel the leading end of the tube is further expanded in passing over the bead 41, and then tends to contract around the rear mandrel element 27 beyond the bead. If such contraction is not complete, closing of the mold ring forces the free end portion of the tube inwardly to the surface 33, and insures that the proper inside diameter will be applied.

After the belled and grooved tube 21 has cooled and set, the core means are retracted simply by rotating the shaft 58 through the angular increment indicated at 64 in FIG. 4, clockwise as viewed in FIGS. 2 and 3, to shift each roller 52 out of its dwell recess 57 and along the arcuate inner end surface 44 of the associated core section 40 to the end thereof. During such movement, the springs 65 draw the core sections inwardly, drawing the arcuate inner end surfaces 44 into the recesses 53 in the expanding member 51, between the arms, until the parts are in the retracted positions shown in FIG. 3.

It will be noted in FIG. 3 that the core sections 39 are of shallower radial extent than the core sections 40, their apexes being substantially even with the ends of the arcuate surfaces 44. These ends, of course, are much shallower in radial position because of the convex curvature of the surfaces. Thus, in the contracted condition of the core means, the apexes are close to, or against, the rollers 52.

As the core means are being expanded for the next groove-forming operation (whether before or after a heated tube is in place), the shaft 58 is rotated counterclockwise through the increment 64 in FIG. 4, and each roller 52 rolls along the right portion of the inner end surface 44 of the associated core section 40, cooperating with the surface to force the section smoothly outwardly. As the sections 40 move outwardly, the sides 43 thereof act as wedges sliding on the sides 42 of the sections 39, thus forcing these out as well, and spreading them progressively farther apart.

As each roller 52 reaches the beginning of the arcuate recess 57, the outer surfaces of the core sections 39 and 40 move into arcuate peripheral alignment and the external shoulders 49 and 50 move into engagement with the internal shoulder 48 on the flange 34, thus completing expansion of the core means with the core sections precisely positioned. Continued movement of the rollers into the recesses does not affect this positioning, because the recesses are coaxial with the expanding member and with the outer surfaces of the mandrel.

It will be evident that precision is important in the initial manufacture of the apparatus, including the machining of the bead 41 and the shoulders 48, 49 and 50, and the fabrication of the expanding member 51. The back-and-forth rotation along matched elements and surfaces maintains this precision in repetitive operation.

While the rollers 52 are in the recesses 57, the core sections 39 and 40 are positively held in the expanded condition, apart from the actuating force applied by the actuator 61. This minimizes the structural and power requirements for sustaining the external forces tending to collapse the core means, and thus makes it possible to simplify the structure and operation of the apparatus.

From the foregoing, it will be apparent that the present invention provides an axially compact belling apparatus 20 that is relatively simple in construction and operation, as compared with prior machines for similar purposes, and thus can be manufactured to sell at highly competitive prices. The simplicity is attributable principally to the manner of actuation and positioning of the core sections, and also to the simple construction of the mandrel. At the same time, the apparatus of the invention is highly effective for producing tubing with internally grooved bells of the desired shape and dimensions.

It also will be evident that, while a specific embodiment of the invention has been illustrated and described, various modifications and changes may be made by those skilled in the art without departing from the spirit and scope of the invention.

We claim:

1. Apparatus for forming bells on plastic tubes of a first preselected inside diameter by enlarging the ends of the tubes to a larger preselected diameter, and also forming an internal annular seal-receiving groove in each such bell, said apparatus comprising:

an elongated mandrel of circular cross-section comprising front and rear mandrel elements disposed in coaxial relation with the adjacent ends of said elements spaced apart to provide a continuous gap between the elements;

said front mandrel element having a free end portion with an outer surface of said first preselected diameter and also having a beveled free end, the opposite end portion of said front element having an outside surface of said larger preselected diameter and joined to said free end portion by an intermediate portion of progressively increasing outside diameter, and said rear element having an outer surface of said larger preselected diameter;

internal annular flanges on said mandrel elements on opposite sides of said gap;

angularly spaced supporting pins extending longitudinally of said mandrel across said gap and each fixed at its opposite ends to the respective internal flanges on said elements, thereby to support said front element on said rear element;

core means disposed in said gap and comprising first and second sets of core sections each having a contoured outside surface of arcuate cross-section, the core sections of said first set alternating with the core sections of said second set around said mandrel and having inwardly converging sides, and the core sections of said second set having inwardly diverging sides disposed in sliding camming engagement with said converging sides, and also having generally arcuate and convex inner end surfaces disposed radially inwardly beyond the sections of said first set, said inner end surfaces having central dwell recesses in the central portions thereon;

said core sections being movable outwardly in said gap to an expanded condition in which said outside surfaces extend beyond the mandrel surfaces of said larger diameter and form a raised annular bead of preselected contour for forming said seal-receiving groove in a plastic tube, and being movable inwardly to a collapsed condition in which said core sections are retracted into said mandrel;

each of said core sections having at least one generally radial guide slot therein, said supporting pins extending through said slots with close sliding fits to guide said core sections for in and out radial movement;

opposed annular abutment means on one of said flanges and on the adjacent side of said core means limiting outward movement of said core sections and determining said expanded condition;

and actuating means for expanding and retracting said core means, said actuating means comprising a rotary drive shaft coaxial with said mandrel and extending into said rear section from the rear end thereof, a spider in said gap coaxially mounted on said shaft for rotation therewith and having angularly spaced arms equal in number to the number of second core sections, adjacent arms of said spider being separated by arcuate recesses for receiving said inner end surfaces when said core sections are retracted, rollers mounted on the ends of said arms, means for selectively rotating said shaft back and forth through a selected angular increment to move said rollers along said inner end surfaces from corresponding ends thereof to the dwell portions and back, and spring means yieldably urging said core sections toward the retracted position, said dwell portions being shaped to prevent forcing of said rollers back along said inner end surfaces by external forces on said core sections.

2. Apparatus as defined in claim 1 in which said dwell portions are recesses of concave curvature coaxial with said mandrel.

3. Apparatus as defined in claim 1 in which said opposed abutment means comprise an inwardly facing annular shoulder on one of said flanges, and outwardly facing arcuate shoulders on the sides of said core sections adjacent said one flange.

4. Bell-forming apparatus as defined in claim 1 in which said rear mandrel section has an end wall through which said shaft extends and in which the shaft is journaled, and said means for rotating said shaft comprise a radially extending arm of said shaft beyond said end wall, and an actuator connected to said arm to swing the latter back and forth through said angular increment.

5. Bell-forming apparatus as defined in claim 1 in which each of the core sections of one of said sets has two generally radial guide slots parallel to a radius of said mandrel, with two of said pins extending through said slots.

6. Apparatus for forming bells on plastic tubes of a first preselected inside diameter by enlarging the ends of the tubes to a larger preselected diameter, and also forming an internal annular seal-receiving groove in each such bell, said apparatus comprising:

an elongated mandrel comprising front and rear mandrel elements disposed in coaxial relation with the adjacent ends of said elements spaced apart to provide a gap between the elements;

said front mandrel element having a free end portion with an outer surface of approximately said first preselected diameter and an opposite end portion with an outer surface that is of said larger preselected diameter;

supporting pins extending longitudinally of the mandrel across said gap and secured to the respective mandrel elements to support said front element on said rear element;

core means disposed in said gap and comprising first and second sets of core sections each having a contoured outside surface or arcuate cross-section, the core sections of said first set alternating with the core sections of said second set around said mandrel and having inwardly converging sides, and the core sections of said second set having inwardly diverging sides disposed in sliding camming engagement with said converging sides, and also having inner end surfaces;

said core sections being movable outwardly in said gap to an expanded condition in which said outside surfaces extend beyond the outer mandrel surfaces of said larger diameter and form a raised annular bend of preselected contour for forming said seal-receiving groove in a plastic tube, and being movable inwardly to a collapsed condition in which said core sections are retracted into said mandrel;

means guiding said core sections for in and out radial movement, including elongated, generally radially extending guide slots in said core sections, said supporting pins extending through said guide slots with close sliding fits;

and actuating means for expanding and retracting said core means, said actuating means comprising a rotary expanding member mounted in said gap in coaxial relation with said mandrel and having angularly spaced outwardly extending expanders equal in number to the number of said second core sections, and recesses between said expanders for receiving said inner end surfaces when said core sections are retracted, and means for rotating said expanding member back and forth through a selected angular increment to move said expanders arcuately back and forth between expanding positions centrally located along said inner end surfaces and retracting positions spaced angularly from said expanding positions;

said inner end surfaces being shaped to cooperate with said expanders in camming said second core sections outwardly to the expanded condition as said expanders move to said expanding positions, and said inner end surfaces having centrally positioned dwell means thereon for engaging said expanders and stabilizing said expanders in the expanding positions.

7. Bell-forming apparatus as defined in claim 6 in which said expanding member is a spider having a plurality of radial arms separated by concave recesses, and having roller journaled on each arm adjacent its free end to engage an associated inner end surface and to turn about an axis parallel to the axis of said expanding member, thereby to roll on the inner end surface as said spider is turned.

8. Bell-forming apparatus as defined in claim 6 in which said inner ends of said second core sections are of inwardly convex curvature, and said centrally positioned dwell means are inwardly concave recesses in said inner ends that are coaxial with said expander and said mandrel.

9. Bell-forming apparatus as defined in claim 6 in which said mandrel elements have internal annular flanges around their adjacent ends, and in which said supporting pins are secured in said flanges in angularly spaced positions around the axis of the mandrel.

10. Bell-forming apparatus as defined in claim 9 in which at least one of said flanges has an inwardly facing annular shoulder of a preselected register diameter, said core sections having outwardly facing arcuate shoulders having the same register diameter and engaging said inwardly facing shoulder when said expanders are in said expanding positions in engagement with said dwell means.

11. Bell-forming apparatus as defined in claim 10 in which said rear mandrel section has a rear end wall with a central annular boss extending toward said gap and defining a longitudinal bore, said means for rotating said expanding member including a shaft journaled in said bore and having a forward end on which said expanding member is mounted.

12. Bell-forming apparatus as defined in claim 11 further including spring means acting between said shaft and said core sections to urge said core sections yieldably inwardly.

13. In an apparatus for molding an internal annular radial deformation in a tubular article of plastic material comprising:

core means divided into first and second pluralities of circumferentially disposed sections that surround the axis of said core means, said sections being movable from an article-forming position in which the adjacent sections are abutting and form a continuous radial deformation from one section to the next section, to a retracted position in which the adjacent sections are radially translatorily shifted, the sections having longitudinally extending, radially interfering sides such that radial inward shifting of the first plurality of sections provides clearance for radial inward shifting of the second plurality of sections;

the core sections of said first plurality having inwardly converging sides and convex arcuate outer surfaces, the core sections of the second plurality having inwardly diverging sides and convex arcuate inner and outer surfaces;

guide means for maintaining said sections in an axially fixed plane during shifting movement;

actuating means for shifting said sections outwardly toward the article forming position, comprising a shaft coaxial with said core means, a spider mounted on said shaft and having rollers for engagement with the arcuate inner surfaces of the core sections of said second plurality, and spring means urging said sections inwardly and holding said arcuate inner surfaces against said rollers;

and concave surface areas on said arcuate inner surfaces at the mid points thereof to stabilize said rollers when the core sections are in their radially outward positions.

14. Apparatus for forming bells on plastic tubes of a first preselected inside diameter by enlarging the ends of the tubes to a larger preselected diamter, and also forming an internal annular seal-receiving groove in each such bell, said apparatus comprising:

an elongated mandrel of circular cross-section comprising front and rear mandrel elements disposed in coaxial relation with the adjacent ends of said elements spaced apart to provide a gap between the elements;

said front mandrel element having a free end portion with an outer surface of said first preselected diameter and also having a beveled free end, the opposite end portion of said front element having an outside surface of said larger preselected diamter and joined to said free portion by an intermediate portion of progressively increasing outside diameter, and said rear element having an outer surface of said larger preselected diamter;

internal annular flanges on said mandrel elements on opposite sides of said gap;

a plurality of supporting pins extending longitudinally of said mandrel across said gap and each fixed at its opposite ends to the respective internal flanges on said elements, said pins constituting the sole support for said front element on said rear element;

core means disposed in said gap and comprising first and second sets of core sections each having a contoured outside surface of arcuate cross-section, the core sections of said first set alternating with the core sections of said second set around said mandrel and having inwardly converging sides, and the core sections of said second set having inwardly diverging sides disposed in sliding camming engagement with said converging sides, and having inner end surfaces;

said core sections being movable outwardly in said gap to an expanded condition in which said outside surfaces extend beyond the mandrel surfaces of said larger diameter and form a raised annular bead of preselected contour for forming said seal-receiving groove in a plastic tube, and being movable inwardly to a collapsed condition in which said core sections are retracted into said mandrel;

each of said core sections having at least one generally radial guide slot therein, said supporting pins extending through said slots to guide said core sections for radial movement;

and rotary actuating means for expanding and retracting said core means, said actuating means comprising a drive shaft coaxial with said mandrel and extending into said rear section from the rear end thereof, an expanding element coaxially mounted on said shaft in said gap and having angularly spaced expanders equal in number to the number of second core sections, means for selectively rotating said shaft back and forth through a selected angular increment to move said expanders back and forth along said inner end surfaces, said expanders and said inner end surfaces being shaped to cam said second core sections outwardly and to expand said core means as said expanding element moves in one direction through said increment.

15. Apparatus for forming an internal annular seal-receiving groove in the end portion of a plastic tube, said apparatus comprising:

an elongated mandrel comprising front and rear mandrel elements disposed in coaxial relation with the adjacent ends of said elements spaced apart to provide a gap between the elements;

said elements having outer surfaces of preselected outside diamters on opposite sides of said gap, and having adjacent radial end surfaces forming the sides of said gap;

core means disposed in said gap and comprising first and second sets of core sections alternating around said mandrel and each having a contoured outside surface of arcuate cross-section, said core sections being movable outwardly in said gap between said end surfaces to an expanded condition in which said outside surfaces extend beyond said outer surfaces of said mandrel element and form a raised annular bead of preselected contour for forming the seal receiving groove in a plastic tube, and being movable inwardly to a collapsed condition in which said core sections are retracted into said mandrel;

means including said end surfaces for guiding said core sections for in and out movement;

at least one of said surfaces having inwardly facing annular shoulder means thereon coaxial with said surfaces of said mandrel elements and forming a reference diameter for said core sections, and said core sections having outwardly facing arcuate shoulder means thereon opposing said inwardly facing shoulder means and abutting against the latter when said core sections are in said expanded condition;

and actuating means for expanding and retracting said core means comprising a rotary expanding member mounted in said gap in coaxial relation with said mandrel elements and said inwardly facing annular shoulder means, and means for rotating said expander back and forth through a preselected angular increment;

said core sections and said expander having coacting cam and follower means thereon for forcing said core sections to said expanded condition as said expander rotates in one direction through said angular increment, and holding said outwardly facing shoulder means in abutting engagement with said inwardly facing shoulder means, thereby positively positioning said core sections with said contoured outside surfaces accurately located relative to said outer surfaces of said mandrel elements.

16. Apparatus as defined in claim 15 in which said expander is mounted on a rotary shaft that is coaxial with said mandrel, and further including spring means acting between said core sections and said shaft to urge said core sections yieldably inwardly.

17. Apparatus as defined in claim 15 in which said cam and follower means comprise inwardly convex end surfaces on the core sections of one of said sets, and a plurality of expanders on said expanding member movable along said inwardly convex end surfaces from one end of each toward the central portions thereof and positioned to force the core sections outwardly.

18. Apparatus as defined in claim 17 in which said inwardly convex end surfaces have concave recesses coaxial with said shoulder means in said central portions, and said expanders are positioned to reach said recesses as said shoulder means come into abutment.

19. Apparatus as defined in claim 18 in which said expanders are rollers mounted on said expanding member to rotate about axes parallel to the axes of said mandrel.

20. Apparatus as defined in claim 18 in which said inwardly facing shoulder means is a continuous annular shoulder on one of said adjacent end surfaces.

21. Apparatus as claimed in claim 15 in which said adjacent end surfaces are on inwardly extending annular flanges on said mandrel elements, said inwardly facing annular shoulder means are on one of said flanges, and said guide means for said core sections include a plurality of supporting pins secured at opposite ends in said flanges and extending longitudinally across said gap, said pins constituting the sole support for said front mandrel element and said core sections having elongated, generally radial guide slots through which said pins extend with a close sliding fit to guide the core sections.

22. Apparatus as claimed in claim 13 in which said means for guiding said core sections include a plurality of pins extending longitudinally across said gap and having opposite end portions fixed in said mandrel elements, and elongated, generally radial slots in said core sections, said pins extending through said slots with close sliding fits and constituting the sole support for said front mandrel element.

* * * * *

UNITED STATES PATENT OFFICE
CERTIFICATE OF CORRECTION

Patent No. 4,032,282   Dated June 28, 1977

Inventor(s) Clyde E. Wilson et al.

It is certified that error appears in the above-identified patent and that said Letters Patent are hereby corrected as shown below:

Column 3, line 47, change "of" to --are--

Column 8, line 63, change "or" to --of--

Column 9, line 7, change "bend" to --bead--

Column 10, line 47, change "diamter" to --diameter-- line 59, change "diamter" to --diameter-- line 60, after "free" insert --end-- line 63, change "diamter" to --diameter--

Column 11, line 48, change "diamter" to --diameter--.

Signed and Sealed this

Twenty-fourth Day of January 1978

[SEAL]

Attest:

RUTH C. MASON
Attesting Officer

LUTRELLE F. PARKER
Acting Commissioner of Patents and Trademarks